US008694249B2

(12) United States Patent
Mastrangelo et al.

(10) Patent No.: US 8,694,249 B2
(45) Date of Patent: Apr. 8, 2014

(54) MICROFABRICATED FLEXIBLE GROUND REACTION SENSOR CLUSTER FOR NAVIGATION IN GPS-DENIED ENVIRONMENTS

(75) Inventors: Carlos H. Mastrangelo, Salt Lake City, UT (US); Rajesh Surapaneni, Salt Lake City, UT (US)

(73) Assignee: The University of Utah Research Foundation, Salt Lake City, UT (US)

( * ) Notice: Subject to any disclaimer, the term of this patent is extended or adjusted under 35 U.S.C. 154(b) by 455 days.

(21) Appl. No.: 13/192,328

(22) Filed: Jul. 27, 2011

(65) Prior Publication Data
US 2012/0029819 A1 Feb. 2, 2012

Related U.S. Application Data

(60) Provisional application No. 61/400,411, filed on Jul. 27, 2010, provisional application No. 61/461,653, filed on Jan. 21, 2011.

(51) Int. Cl.
*G01C 22/00* (2006.01)

(52) U.S. Cl.
USPC ........... 701/472; 324/661; 702/159; 702/188; 702/104

(58) Field of Classification Search
USPC ........... 701/472; 702/141, 188, 159; 324/661; 427/596; 72/132; 73/826.625
See application file for complete search history.

(56) References Cited

U.S. PATENT DOCUMENTS 7,457,724 B2 * 11/2008 Vock et al. .................... 702/182
7,983,876 B2 * 7/2011 Vock et al. .................... 702/182
8,583,402 B2 * 11/2013 Yuen et al. .................... 702/160
8,599,165 B2 * 12/2013 Westhues et al. ............. 345/174
2009/0043531 A1 * 2/2009 Kahn et al. .................... 702/149

(Continued)

FOREIGN PATENT DOCUMENTS

| CN | 102143695 A | * | 8/2011 |
| JP | 2011524207 W | * | 9/2011 |
| WO | WO 2009152456 A2 | * | 12/2009 |

OTHER PUBLICATIONS

Low-interference sensing electronics for high-resolution error-correcting biomechanical ground reaction sensor cluster; Suster, M.A. ; Mastrangelo, C. ; Young, D.J.;Sensors, 2010 IEEE;Digital Object Identifier: 10.1109/ICSENS.2010.5690749; Publication Year: 2010 , pp. 1020-1023.*

(Continued)

*Primary Examiner* — Cuong H Nguyen
(74) *Attorney, Agent, or Firm* — Workman Nydegger

(57) ABSTRACT

Embodiments are directed to a ground reaction sensor cluster (GRSC) and to methods for precisely determining zero velocity points and bearing changes using a GRSC and for navigating using a GRSC and an inertial motion unit (IMU) in a global positioning satellite (GPS)-denied environment. The GRSC device itself includes an array of capacitive pressure and shear sensors. The array includes multiple flexible capacitive sensor cells that detect changes in capacitance in response to a footstep. Each cell of the array includes multiple overlapping, fingered capacitors that detect pressure and shear force by determining the change in capacitance in each fingered capacitor. The GRSC device also includes a multiplexing receiver that receives the capacitance inputs from each of the capacitive sensor cells. The multiplexing receiver and other electronic elements further process the received capacitance inputs to determine, based on the pressure and shear forces, the direction and bearing of the footstep.

20 Claims, 5 Drawing Sheets

(56) References Cited

U.S. PATENT DOCUMENTS

2010/0063779 A1* 3/2010 Schrock et al. ............... 702/188
2012/0029819 A1* 2/2012 Mastrangelo et al. ........ 701/472
2012/0038583 A1* 2/2012 Westhues et al. ............. 345/174
2013/0268236 A1* 10/2013 Yuen et al. ................... 702/160

OTHER PUBLICATIONS

Characterization of electrical interferences for ground reaction sensor cluster;Qingbo Guo ; Suster, M.A.; Surapaneni, R.; Mastrangelo, C.H. ; Young, D.J.[Sensors, 2012 IEEE; Digital Object Identifier: 10.1109/ICSENS.2012.6411379; Publication Year: 2012 , pp. 1-4.*
A highly sensitive flexible pressure and shear sensor array for measurement of ground reactions in pedestrian navigation Surapaneni, R. ; Park, K. ; Suster, M.A. ; Young, D.J. ; Mastrangelo, C.H.;Solid-State Sensors, Actuators and Microsystems Conf. (Transducers), 2011 16th Inter.; Digital Object Id: 10.1109/Transducers.2011; pp. 906-609.*
A high precision reference data set for pedestrian navigation using foot-mounted inertial sensors; Angermann, M. ; Robertson, P. ; Kemptner, T. ; Khider, M.; Indoor Positioning and Indoor Navigation (IPIN), 2010 International Conference on Digital Object Identifier: 10.1109/IPIN.2010.5646839; Publication Year: 2010 , pp. 1-6.*
Simulation Analysis on Characteristics of a Planar Capacitive Sensor for Large Scale Measurement; Jianping Yu ; Wen Wang ; Xinxin Li ; Zhu Zhu ; Zichen Chen; Intelligent Computation Technology and Automation, 2009. ICICTA '09. Second International Conf. on; vol. 2; Digital Object Id. 10.1109/ICICTA.2009.286; Pub. Year: 2009, pp. 201-204.*
High-Performance Interface Electronic System for a 13, x, 13 Flexible Biomechanical Ground Reaction Sensor Array Achieving a Gait Ground Velocity Resolution of 100 Qingbo Guo et al.; Sensors Journal, IEEE;vol. 13 , Issue: 11; Digital Obj. Id. 10.1109/JSEN.2013. 2267613; Pub.i Year: 2013 , pp. 4496-4505.*
Gait analysis of a human walker wearing robot feet as shoes; Sardain, P. ; Bessonnet, G.; Robotics and Automation, 2001. Proceedings 2001 ICRA, IEEE International Conference on; vol. 3; Digital Obj Id. 10.1109/Robot.2001.932963 Pub. Year: 2001 , pp. 2285-2292 vol. 3.*

* cited by examiner

MICROFABRICATED FLEXIBLE GROUND REACTION SENSOR CLUSTER FOR NAVIGATION IN GPS-DENIED ENVIRONMENTS

CROSS-REFERENCE TO RELATED APPLICATIONS

This application claims the benefit of both U.S. Provisional Application No. 61/400,411, filed Jul. 27, 2010, entitled "MICROFABRICATED FLEXIBLE GROUND REACTION SENSOR CLUSTER FOR NAVIGATION IN GPS-DENIED ENVIRONMENTS," and U.S. Provisional Application No. 61/461,653, filed Jan. 21, 2011, entitled "HIGHLY SENSITIVE FLEXIBLE PRESSURE AND SHEAR SENSOR ARRAY FOR MEASUREMENT OF GROUND REACTIONS IN PEDESTRIAN NAVIGATION." The disclosures of the foregoing applications are incorporated herein in their entirety.

BACKGROUND

Navigation using global positioning satellites (GPSs) has become increasingly commonplace in today's society. All types of devices from cellular telephones to automobiles to exercise watches have begun to implement GPS location and tracking systems. These systems allow users of these devices to know where they are in relation to the earth, and where they heading. Using triangulation between different satellites, the devices can determine the user's current position, velocity, direction and even elevation. Such devices are, thus, very useful in areas where satellite reception is good.

However, in many areas, such as urban areas with tall buildings, tunnels surrounded by concrete, or in mountain valleys, GPS units do not work due to limited or no reception. Because the satellites cannot communicate with the GPS-enabled device, the device will display an indication to the user that GPS functionality is no longer working. At this point, the GPS device does not know where the user is or where the user is going.

In such GPS-denied environments, stand-alone inertial motion units (IMUs) have traditionally been used to determine which way the user is moving. IMUs typically combine an array of gyros and an accelerometer to detect the user's movements and extrapolate an estimated path of travel. However, over a short amount of time, these IMUs lose accuracy and wrongly determine the user's path of travel.

BRIEF SUMMARY

Embodiments described herein are directed to a ground reaction sensor cluster (GRSC) and to methods for precisely determining zero velocity points and bearing changes using a GRSC and for navigating using a GRSC and an inertial motion unit (IMU) in a global positioning satellite (GPS)-denied environment. The GRSC device itself includes an array of capacitive pressure and shear sensors. The array includes multiple flexible capacitive sensor cells that detect changes in capacitance in response to a footstep. Each cell of the array includes multiple overlapping, fingered capacitors that detect pressure and shear force by determining the change in capacitance in each fingered capacitor. The array of sensors may be distributed along a contact portion of a shoe. The GRSC device also includes a multiplexing receiver that receives the capacitance inputs from each of the capacitive sensor cells. The multiplexing receiver is communicatively connected to other electronic elements that further process the received capacitance inputs to determine, based on the detected pressure and shear forces, the direction and bearing of the footstep.

In one embodiment, zero velocity points and bearing changes are determined using a GRSC. The GRSC detects a user's footstep using an array of pressure and shear sensors distributed along a contact portion of a user's shoe. The pressure sensing elements of the GRSC measure the distribution of ground reaction and shear sensing elements of the GRSC measure lateral forces and torque. The GRSC determines a zero point at which the user's shoe is at zero velocity based on the detected pressure and shear sensor measurements. The GRSC also determines, based on the lateral force measured by the shear sensor at the zero point, the degree to which the user's bearing has changed. The GRSC then sends the bearing changes to an internal motion unit (IMU) communicatively attached to the GRSC. The IMU uses the determined bearing change to refine its own calculated zero point and velocity determinations.

In another embodiment, a GRSC and an IMU are used to navigate in a GPS-denied environment. The steps involved include the following: determine that a user has passed into an environment where a GPS device used by the user is no longer receiving GPS signals. The GPS device is communicatively connected to a GRSC and an IMU. Next, detect the user's footsteps using the GRSC. The GRSC includes an array of pressure and shear sensors distributed along a contact portion of the user's shoe. Pressure sensing elements of the GRSC measure the distribution of ground reaction and shear sensing elements of the GRSC measure lateral forces and torque. The GRSC determines a zero point at which the user's shoe is at zero velocity based on the detected pressure and shear sensor measurements. The GRSC also determines, based on the lateral force measured by the shear sensor at the zero point, the degree to which the user's bearing has changed. The GRSC then sends the bearing changes to an internal motion unit (IMU) communicatively attached to the GRSC. The IMU uses the determined bearing change to refine its own calculated zero point and velocity determinations. The user's direction and velocity are then determined using the measurements of the GRSC and the IMU to navigate the user until the user's GPS device is back in range of GPS satellites.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
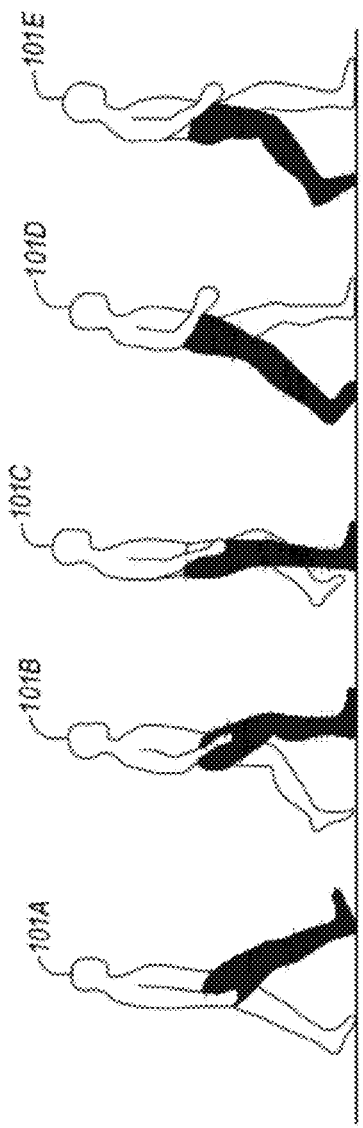
FIG. 1 illustrates a sequence of images conveying a walking individual.

Embodiments described herein are directed to a ground reaction sensor cluster (GRSC) and to methods for precisely determining zero velocity points and bearing changes using a GRSC and for navigating using a GRSC and an inertial motion unit (IMU) in a global positioning satellite (GPS)-denied environment. The GRSC device itself includes an array of capacitive pressure and shear sensors. The array includes multiple flexible capacitive sensor cells that detect changes in capacitance in response to a footstep. Each cell of the array includes multiple overlapping, fingered capacitors that detect pressure and shear force by determining the change in capacitance in each fingered capacitor. The array of sensors may be distributed along a contact portion of a shoe. The GRSC device also includes a multiplexing receiver that receives the capacitance inputs from each of the capacitive sensor cells. The multiplexing receiver is communicatively connected to other electronic elements that further process the received capacitance inputs to determine, based on the detected pressure and shear forces, the direction and bearing of the footstep.

In one embodiment, zero velocity points and bearing changes are determined using a GRSC. The GRSC detects a user's footstep using an array of pressure and shear sensors distributed along a contact portion of a user's shoe. The pressure sensing elements of the GRSC measure the distribution of ground reaction and shear sensing elements of the GRSC measure lateral forces and torque. The GRSC determines a zero point at which the user's shoe is at zero velocity based on the detected pressure and shear sensor measurements. The GRSC also determines, based on the lateral force measured by the shear sensor at the zero point, the degree to which the user's bearing has changed. The GRSC then sends the bearing changes to an internal motion unit (IMU) communicatively attached to the GRSC. The IMU uses the determined bearing change to refine its own calculated zero point and velocity determinations.

In another embodiment, a GRSC and an IMU are used to navigate in a GPS-denied environment. The steps involved include the following: determine that a user has passed into an environment where a GPS device used by the user is no longer receiving GPS signals. The GPS device is communicatively connected to a GRSC and an IMU. Next, detect the user's footsteps using the GRSC. The GRSC includes an array of pressure and shear sensors distributed along a contact portion of the user's shoe. Pressure sensing elements of the GRSC measure the distribution of ground reaction and shear sensing elements of the GRSC measure lateral forces and torque. The GRSC determines a zero point at which the user's shoe is at zero velocity based on the detected pressure and shear sensor measurements. The GRSC also determines, based on the lateral force measured by the shear sensor at the zero point, the degree to which the user's bearing has changed. The GRSC then sends the bearing changes to an internal motion unit (IMU) communicatively attached to the GRSC. The IMU uses the determined bearing change to refine its own calculated zero point and velocity determinations. The user's direction and velocity are then determined using the measurements of the GRSC and the IMU to navigate the user until the user's GPS device is back in range of GPS satellites.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

Figure 4:
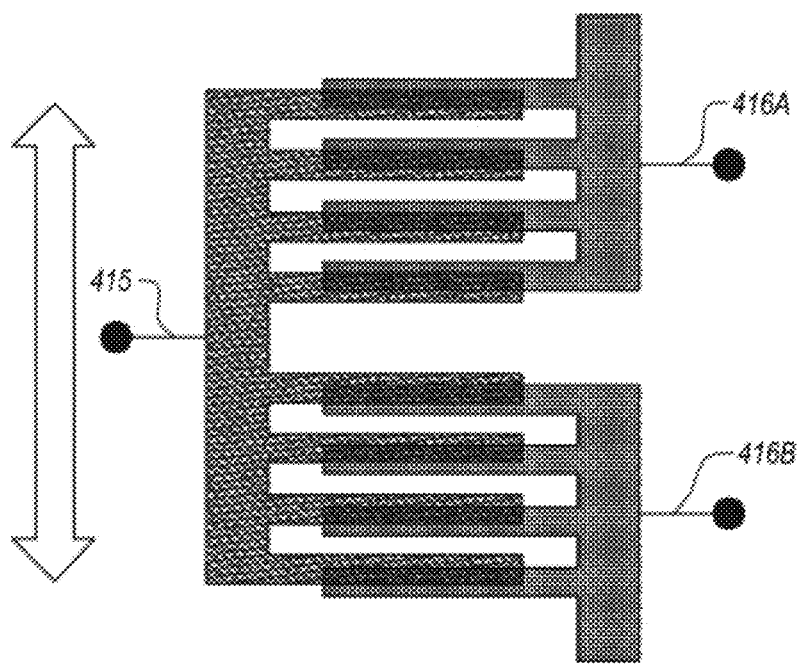
FIG. 4 illustrates fingered capacitive sensors.
Figure 5:
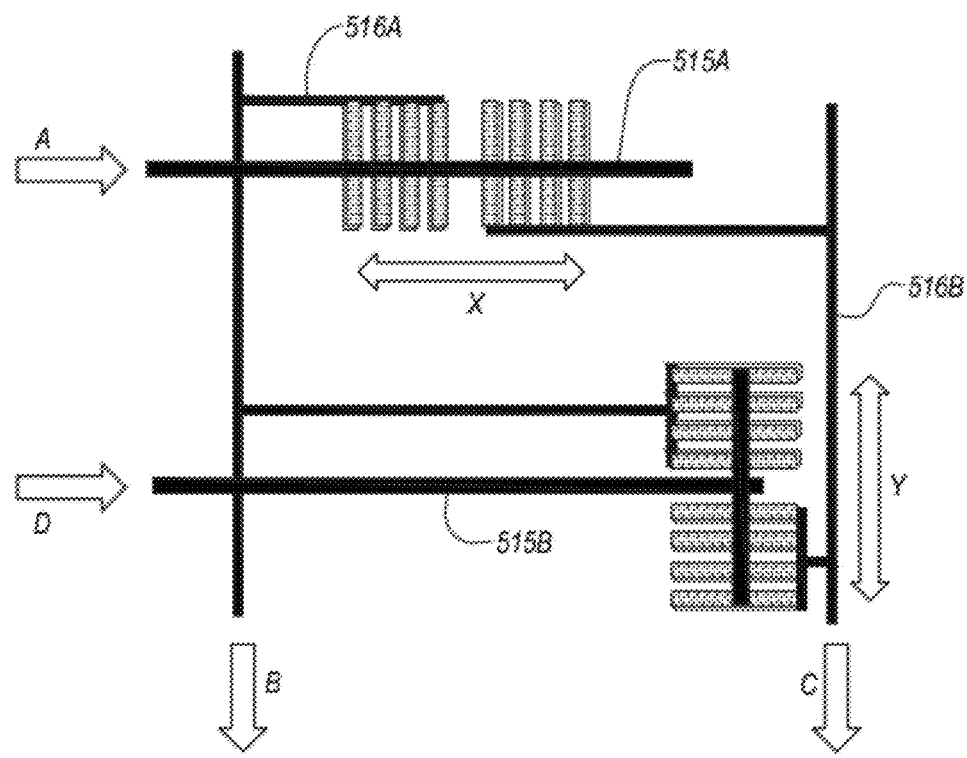
FIG. 5 illustrates a cell of the capacitive array of pressure and shear force sensors.
Figure 6:
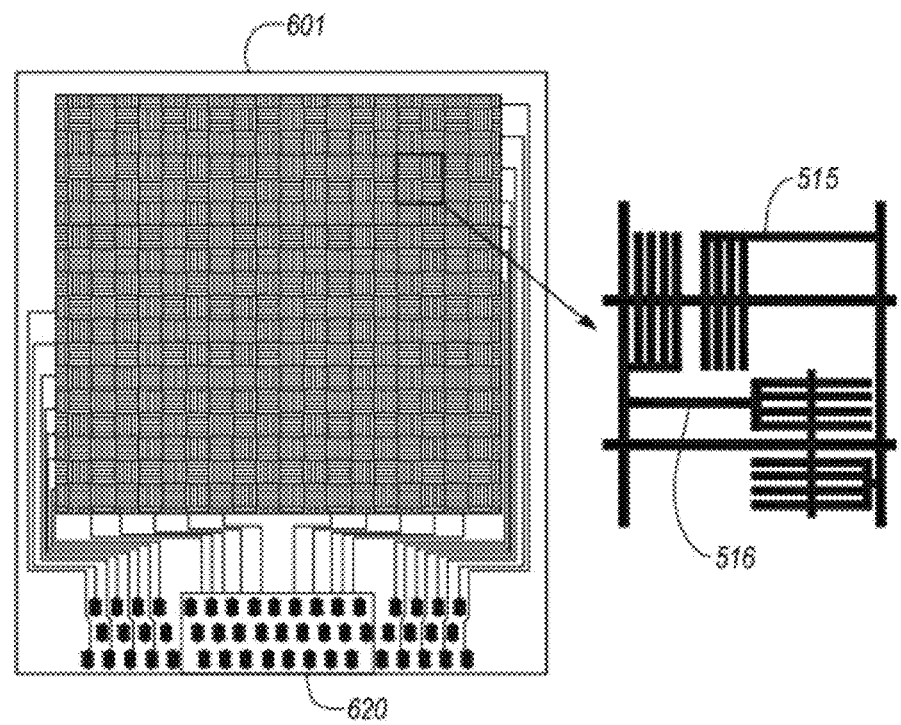
FIG. 6 illustrates normalized and close-up views of the capacitive array.

As indicated above, a high-resolution ground reaction sensor cluster (GRSC) may be provided as an auxiliary sensor for pedestrian navigation. The GRSC includes a flexible high-density array of compressible, elastomeric capacitive pressure and two-dimensional shear sensors. When placed at the heel of a shoe or boot, the multi-cell GRSC measures detailed information about the position and motion of the line of contact with the ground. The GRSC uses fingered capacitive sensors that provide a large sensitivity to shear stress. As used herein, the terms "fingered capacitor" or "fingered capacitive sensor" refer to capacitors that include one or more capacitive prongs which may be arranged in various patterns. As shown in FIGS. 4-6, the fingered capacitors may arranged substantially parallel to one another, and may be grouped together in groups of (e.g. four) prongs.

The GRSC may be used in conjunction with an inertial motion unit (IMU). IMUs typically include arrays of miniature gyros and accelerometers. These sensors are subject to many biases that can produce large positional errors in very short times. For accurate navigation in these systems, these biases must be corrected. In the zero point updating (zupting) technique, the auxiliary sensor determines the time when the ground velocity is zero. Zero velocity points can be estimated by using commercially available dead reckoning modules (DRMs) which utilize accelerometers to detect the shoe's impact with the ground. As illustrated in FIG. 1, zero velocity could be detected at multiple points including at heel strike (101A), when the foot is flat (101B), in mid-stance (101C), at push-off (101D) or at toe-off (101E). The actual detection point should occur somewhere between the instance when the foot is flat (101B) and push-off (101D). Properly determining these zero velocity points can reduce the positional errors incurred in the IMU.

Figure 2:
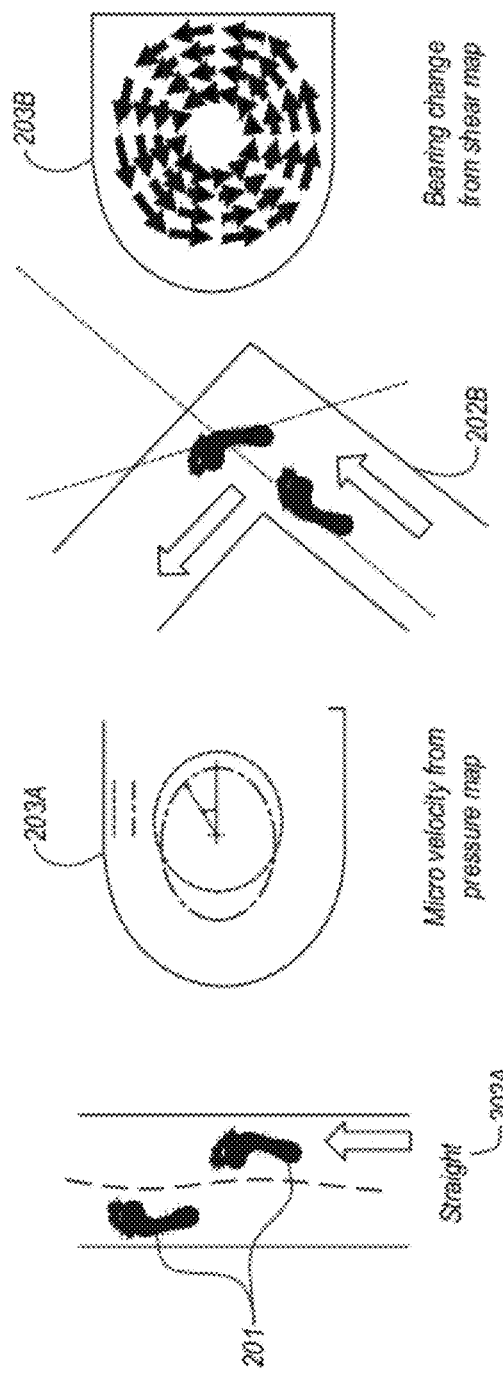
FIG. 2 illustrates pressure and shear force changes that occur during walking.

The GRSC array of pressure and shear sensors distributed along the contact surface of a shoe collect pressure and shear force data while the user is walking (or running) The collected data is used to determine the zero velocity points at each step, as well as the bearing changes of the foot (or feet). As shown in FIG. 2, the pressure sensing elements measure the distribution of ground reaction 203A (as measured from footsteps 201 going in a substantially straight line 202A) and the shear sensing elements measure lateral forces and torque 203B (as measured from the right foot turning left shown in 202B). From the pressure and shear force information of 203A and 203B, the GRSC can determine the ground contact line and its displacement to produce micro-velocity measurements. Similarly the shear information detects slippage and the intended direction of shoe rotation independent of angular velocity magnitude. This information can be utilized to supplement magnetic bearing estimates (e.g. from the IMU) inside buildings or in other GPS-denied areas. This data can also be used to more precisely determine a zero point, and to properly navigate the user.

Figure 3:
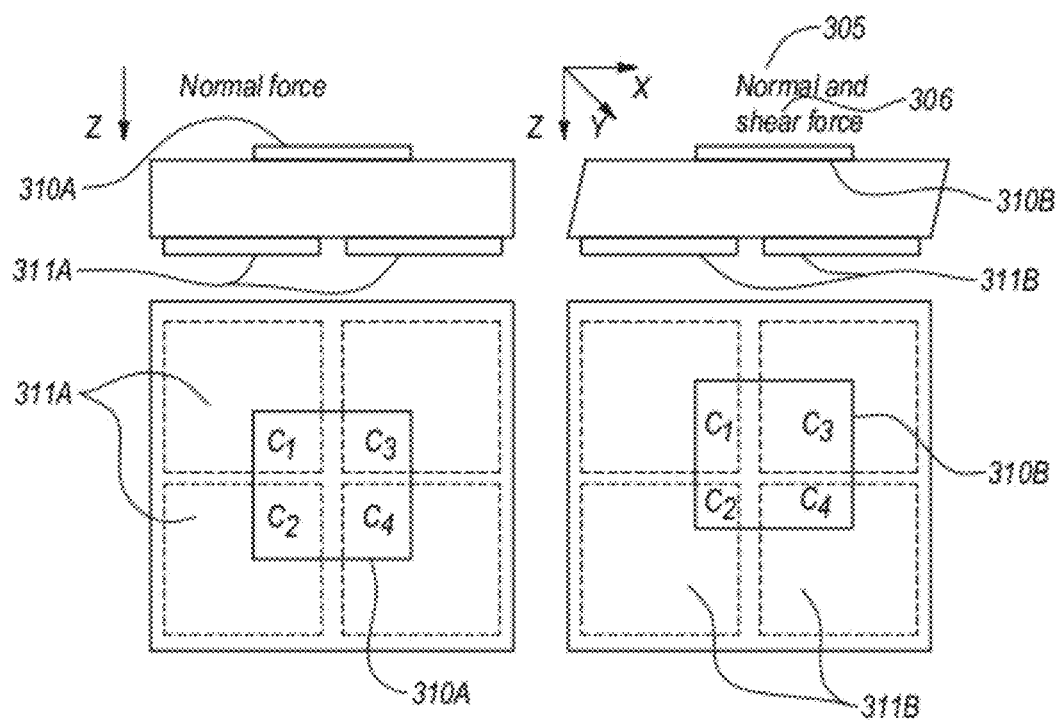
FIG. 3 illustrates a capacitive array of pressure and shear force sensors.

In some embodiments, as shown in FIG. 3, the GRSC can be implemented in a similar fashion to or as an alternative to an array of flexible quad capacitor cells 311A/311B. These cells are sensitive to both normal 305 and shear strain 306. The array of FIG. 3 includes four bottom capacitors overlapped by a single top capacitor 310A/310B. The top central square electrode is placed over an elastic dielectric material with four bottom electrodes. When normal force alone 305 is exerted over the top electrode 310A, the elastic dielectric material is compressed, increasing capacitance between the top and the four bottom electrodes equally. The change in capacitance will vary, however on each plate when there is a combination of normal and shear force 306. As shown in FIG. 3, top electrode 310B is overlapping the top right bottom electrode 311B more than the bottom left bottom electrode. This translates to the top right electrode having a higher capacitance reading, while the bottom left electrode has a lower reading. By detecting the changes in capacitance for each cell in the array, the directional or shear forces can be determined, and a proper bearing can be calculated.

In some embodiments, instead of using square electrodes, fingered electrodes may be used. Each capacitor consists of a series of finger electrodes (e.g. 415 and 416A/416B). The fingers are staggered such that under uniaxial shear, one capacitor increases while the other decreases (i.e. when the foot is turning), but both increase under compression by uniform pressure (i.e when the foot is going straight). The shear sensitivity of the array increases with the number of fingers. The single axis finger structure can be rotated 90 degrees to obtain the shear vector as shown in the single cell structure of FIG. 5. Because there is no overlap of two same-axis finger capacitors along the vertical direction, the two orthogonal sensors at each site (e.g. 515A/516A and 515B/516B) are efficiently interrogated using a dual row select, dual column readout multiplexing scheme. This reduces the connections and increases array density. The four capacitances can be measured by individually addressing each of the two row lines (A,D) while reading on the vertical lines (B,C).

FIG. 6 shows a schematic of a 169-cell GRSC 601 within an area of about 50 cm2 capable of detecting contact line velocities as low as 250 µm/s. Each sensing site consists of two three-terminal finger structures orthogonal to each other (e.g. 515 and 516). Each cell measures capacitance readings at the orthogonally-placed finger sensors, and outputs the measurements to multiplexer 620. Here, it should be noted that while an array of 169 cells is shown, substantially any number of cells may be used in the GRSC.

Figure 8:
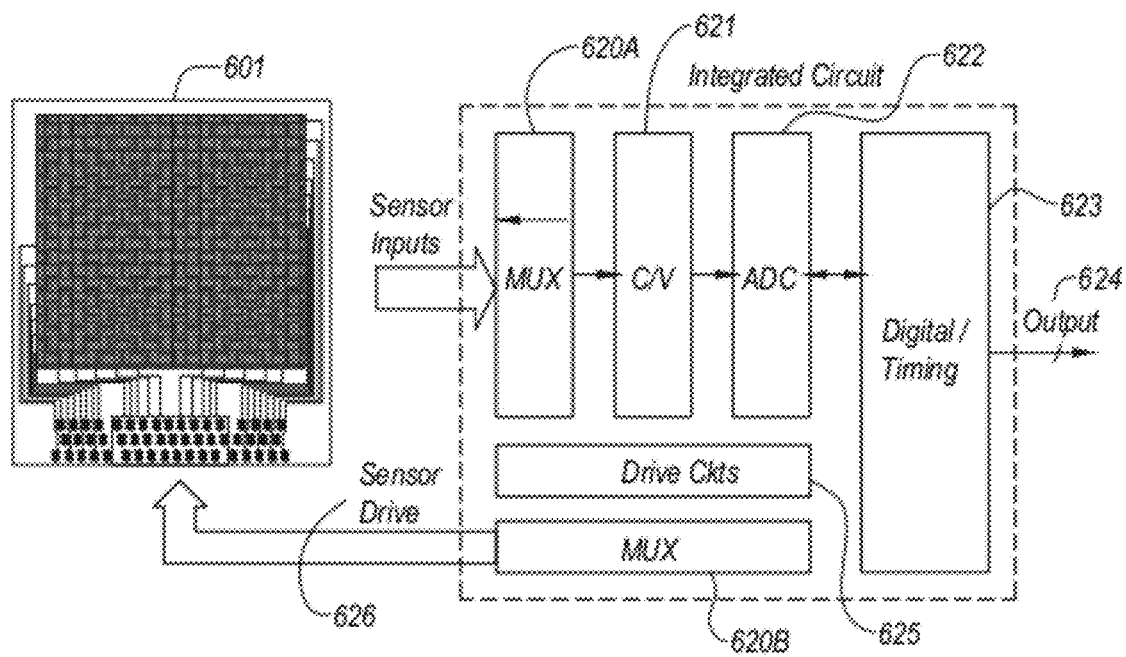
FIG. 8 illustrates an integrated circuit architecture that processes the outputs of the capacitive array.

FIG. 8 shows an example electronic measurement detection system design architecture that includes a front-end multiplexer 620A that can sequentially connect (e.g. 169) individual sensing nodes in a 13×13 GRSC 601 to a capacitance-to-voltage (C/V) converter 621 with correlated double sampling, followed by a (e.g. 12-bit) analog-to-digital converter (ADC) 622 sampled at (e.g. 67 k) samples per second, a digital control unit 623, and driving circuitry 625. Other elements include measurement outputs 624, multiplexer 620B and sensor drive 626 which controls the sensor array 601. The capacitive sensing units can be configured by the switches to achieve differential shear strain sensing along the x and y-axes and single-ended z-axis pressure sensing using the fingered sensors of FIG. 4. The single-ended z-axis pressure sensor calls for a programmable reference capacitor to provide a close match with the sensor capacitance value. The system can thus read and process the measurements of a large, multi-cell array. These concepts will be explained further below with regard to methods 900 and 1000 of FIGS. 9 and 10, respectively.

Figure 9:
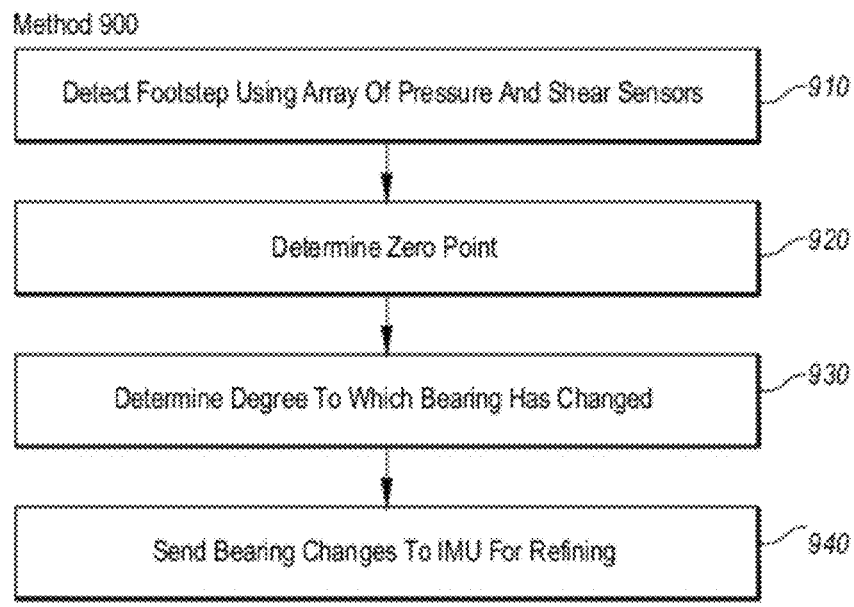
FIG. 9 illustrates a flowchart of an example method for precisely determining zero velocity points and bearing changes using a ground reaction sensor cluster.
Figure 10:
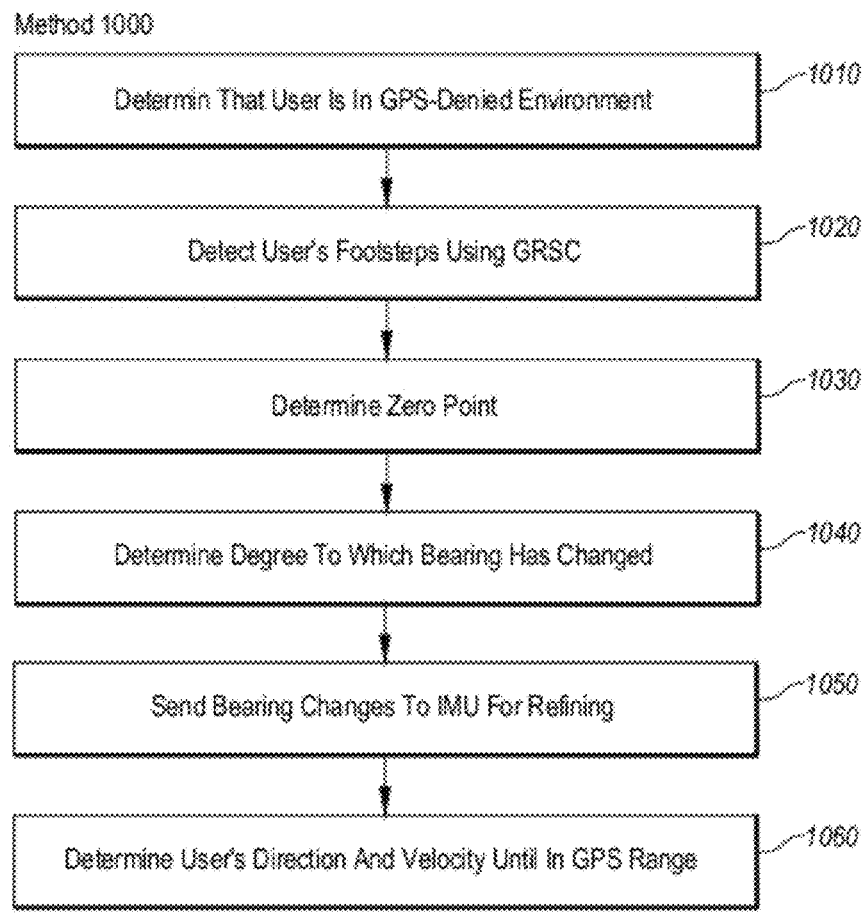
FIG. 10 illustrates a flowchart of an example method for navigating using a ground reaction sensor cluster and an inertial motion unit in a global positioning satellite (GPS)-denied environment.

In view of the systems and architectures described above, methodologies that may be implemented in accordance with the disclosed subject matter will be better appreciated with reference to the flow charts of FIGS. 9 and 10. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 9 illustrates a flowchart of a method 900 for precisely determining zero velocity points and bearing changes using a ground reaction sensor cluster (GRSC). The method 900 will now be described with frequent reference to the components of FIGS. 1-8.

Method 900 includes detecting a user's footstep using an array of pressure and shear sensors distributed along a contact portion of a user's shoe, where pressure sensing elements of the GRSC measure the distribution of ground reaction and shear sensing elements of the GRSC measure lateral forces and torque (910). The GRSC may include the following: an array 601 of capacitive pressure and shear sensors. The array includes a plurality of flexible capacitive sensor cells that detect changes in capacitance in response to a footstep. Each cell of the array includes multiple overlapping, fingered capacitors 515/516 that detect pressure and shear force by determining the change in capacitance in each fingered capacitor. The array of sensors may be distributed along a contact portion of a shoe (e.g. the heel). The GRSC also includes or is communicatively attached to a multiplexing receiver 620A that receives the capacitance inputs from each of the plurality of capacitive sensor cells. The multiplexing receiver is itself communicatively connected to one or more electronic elements that further process the received capacitance inputs to determine, based on the detected pressure and shear forces, the direction and bearing of the footstep.

In some embodiment, the GRSC's array of flexible capacitive sensor cells may include cells which are sensitive to both normal and shear strain. A top, fingered electrode is placed over a flexible bottom electrode. The cells comprise an elastic dielectric material with one or more bottom, fingered electrodes. Upon receiving normal force over the top central square electrode, the elastic dielectric material of the cells is compressed, increasing capacitance between the top, fingered electrode and the one or more bottom, fingered electrodes equally (305). Upon receiving a combination of normal and shear force over the top, fingered electrode, the elastic dielectric material of the cells is compressed unevenly, shifting the top, fingered electrode and changing capacitance between the top electrode and the bottom, fingered electrodes in an uneven manner. The normal force is measured by the amount of equal increase in capacitance between the top, fingered electrode and the bottom, fingered electrodes, and the shear force is measured by the amount of changing capacitance between the top electrode and the bottom electrodes.

The GRSC may be communicatively connected to an inertial motion unit (IMU). The capacitance inputs from the array of capacitive pressure and shear sensors are combined with acceleration inputs from the IMU to determine a zero point at which a user's shoe is at zero velocity based on the detected pressure and shear sensor measurements. The shear measurements measure slippage and a corresponding intended direction of shoe rotation, independent of angular velocity magnitude. As explained above, two overlapping, fingered capacitors may be placed orthogonal to each other in each cell of the capacitive pressure and shear sensors.

Figure 7:
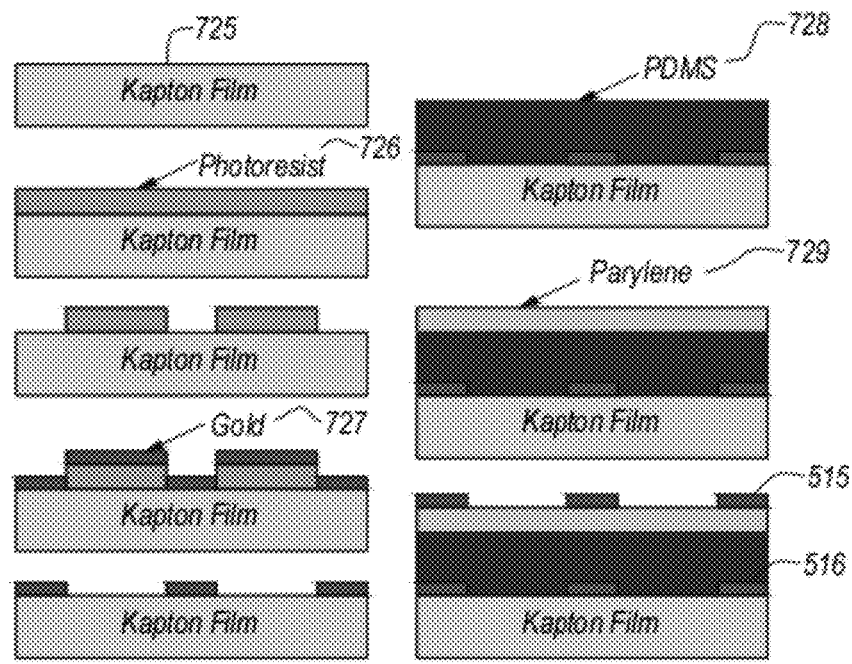
FIG. 7 illustrates the manufacture of a capacitive array.

As shown in FIG. 7, the GRSC sensor array may be manufactured using the following steps: patterning one or more bottom electrodes 516 for each flexible capacitive sensor cell over photoresist 726 placed on a film layer 725 (e.g. KAPTON film); depositing a first conductive layer 727 (e.g. gold) for the bottom electrodes by electronic-beam evaporator over the patterned photoresist; applying an adhesion promoter to facilitate application of an organic silicon layer 728 (e.g. Polydimethylsiloxane (PDMS)); spin coating the organic silicon layer on the adhesion promoter; curing the organic silicon layer; depositing a PARYLENE layer 729 over the organic silicon layer after exposing the organic silicon layer to a PARYLENE adhesion promoter; patterning top electrodes 515 for each cell over the PARYLENE layer; and depositing a second conductive layer for the top electrodes by electronic-beam evaporator over the patterned PARYLENE layer.

Returning to FIG. 9, method 900 includes determining a zero point at which the user's shoe is at zero velocity based on the detected pressure and shear sensor measurements (920). Method 900 next includes determining, based on the lateral force measured by the shear sensor at the zero point, the degree to which the user's bearing has changed (930). For example, if the capacitive outputs indicate a counter-clockwise shear force as shown in 203B, the GRSC may determine that the user is turning left. Method 900 then includes sending the bearing changes to an internal motion unit (IMU) communicatively attached to the GRSC. The IMU uses the determined bearing changes to refine its calculated zero point and velocity determinations (940). Thus, a refined zero point and velocity determination may be used to determine which direction the user's foot is heading. Navigation instructions may be provided to the user, indicating where the user has been and the direction the user is currently going.

FIG. 10 illustrates a flowchart of a method 1000 for navigating using a ground reaction sensor cluster (GRSC) and an inertial motion unit (IMU) in a global positioning satellite (GPS)-denied environment. The method 1000 will now be described with frequent reference to the components of FIGS. 1-8.

Method 1000 includes determining that a user has passed into an environment where a GPS device used by the user is no longer receiving GPS signals. Such locations may include the inside of buildings, the bottom of mountain valleys or other locations where GPS satellites do not have good ground-coverage. The GPS device may be communicatively connected to a GRSC and an IMU (1010). Method 1000 next includes detecting the user's footsteps using the GRSC. As mentioned above, the GRSC includes an array of pressure and shear sensors distributed along a contact portion of the user's shoe. The pressure sensing elements of the GRSC measure the distribution of ground reaction and shear sensing elements of the GRSC measure lateral forces and torque (1020).

Method 1000 further includes determining a zero point at which the user's shoe is at zero velocity based on the GRSC's detected pressure and shear sensor measurements (1030). This zero point may be the point at which pressure and shear sensor inputs are read to determine the user's bearing. Method 1000 further determines, based on the lateral force measured by the shear sensor at the zero point, the degree to which the user's bearing has changed (1040). Thus, if lateral forces indicate a movement to the left or right, the user's bearing can be updated to indicate his or her new direction.

Method 1000 then sends the bearing changes to an internal motion unit (IMU) communicatively attached to the GRSC. The IMU uses the determined bearing change to refine its calculated zero point and velocity determinations (1050). The GRSC thus allows precise zero point determinations, as the array detects very slight movements. When the zero point has been precisely determined, method 100 determines the user's direction and velocity using the measurements of the GRSC and the IMU to navigate the user until the user's GPS device is back in range of GPS satellites (1060). Because the user's velocity and bearing are now known, the user's location can be tracked and monitored, even without GPS connectivity. Later, when the user is back in a GPS-connected area (i.e. when the GPS device receives a signal indicating that the GPS device is connected to a sufficient number of GPS satellites) the GPS device can use the measurements of the GRSC and the IMU as incremental updates regarding the user's continued movements.

Accordingly, methods, systems and apparatuses are provided which precisely determine zero velocity points and bearing changes using a ground reaction sensor cluster (GRSC). Moreover, methods, systems and apparatuses are provided which allow user navigation using a ground reaction sensor cluster (GRSC) and an inertial motion unit (IMU) in a global positioning satellite (GPS)-denied environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A ground reaction sensor cluster (GRSC) comprising the following:
   an array of capacitive pressure and shear sensors, the array comprising a plurality of flexible capacitive sensor cells that detect changes in capacitance in response to a footstep, each cell of the array comprising a plurality of overlapping, fingered capacitors that detect pressure and shear force by determining the change in capacitance in each fingered capacitor, wherein the array of sensors is distributed along a contact portion of a shoe;
   a multiplexing receiver that receives the capacitance inputs from each of the plurality of capacitive sensor cells, wherein the multiplexing receiver is communicatively connected to one or more electronic elements that further process the received capacitance inputs to determine, based on the detected pressure and shear forces, the direction and bearing of the footstep.

2. The ground reaction sensor cluster of claim 1, wherein the GRSC's array of flexible capacitive sensor cells comprises an array of flexible top, fingered electrodes and bottom, fingered electrodes which are sensitive to both normal and shear strain.

3. The ground reaction sensor cluster of claim 2, wherein one or more of the top, fingered electrodes are placed over the flexible, bottom electrodes, the cells comprising an elastic dielectric material.

4. The ground reaction sensor cluster of claim 3, wherein upon receiving normal force over the top, fingered electrode, the elastic dielectric material of the cells is compressed, increasing capacitance between the top, fingered electrode and the bottom, fingered electrodes equally, and upon receiving a combination of normal and shear force over the top, fingered electrode, the elastic dielectric material of the cells is compressed unevenly, shifting the top, fingered electrode and changing capacitance between the top, fingered electrode and each of the bottom, fingered electrodes in an uneven manner.

5. The ground reaction sensor cluster of claim 4, wherein the normal force is measured by the amount of equal increase in capacitance between the top, fingered electrode and the bottom, fingered electrodes, and the shear force is measured by the amount of changing capacitance between the top, fingered electrode and each of the bottom, fingered electrodes.

6. The ground reaction sensor cluster of claim 1, further comprising a communicatively connected inertial motion unit (IMU).

7. The ground reaction sensor cluster of claim 6, wherein the capacitance inputs from the array of capacitive pressure and shear sensors are combined with acceleration inputs from the IMU to determine a zero point at which a user's shoe is at zero velocity based on the detected pressure and shear sensor measurements.

8. The ground reaction sensor cluster of claim 7, wherein the shear measurements measure slippage and a corresponding intended direction of shoe rotation, independent of angular velocity magnitude.

9. The ground reaction sensor cluster of claim 1, wherein two overlapping, fingered capacitors are placed orthogonal to each other in each cell of the capacitive pressure and shear sensors.

10. The ground reaction sensor cluster of claim 1, wherein the multiplexing receiver is communicatively connected to a capacitance-to-voltage (C/V) converter that samples the capacitance inputs from the capacitive sensor cells, followed by an analog-to-digital converter (ADC) sampled at predefined number of samples per second, a digital control unit, and driving circuitry that allows further processing based on the capacitive inputs.

11. The ground reaction sensor cluster of claim 1, wherein the GRSC sensor array is manufactured using the following steps:
    patterning one or more bottom electrodes for each flexible capacitive sensor cell over photoresist placed on a film layer;
    depositing a first conductive layer for the bottom electrodes by electronic-beam evaporator over the patterned photoresist;
    applying an adhesion promoter to facilitate application of an organic silicon layer;
    spin coating the organic silicon layer on the adhesion promoter;
    curing the organic silicon layer;
    depositing a Parylene layer over the organic silicon layer after exposing the organic silicon layer to a Parylene adhesion promoter;
    patterning top electrodes for each cell over the Parylene layer; and
    depositing a second conductive layer for the top electrodes by electronic-beam evaporator over the patterned Parylene layer.

12. A method for precisely determining zero velocity points and bearing changes using a ground reaction sensor cluster (GRSC), the method comprising:
    detecting a user's footstep using an array of pressure and shear sensors distributed along a contact portion of a user's shoe, wherein pressure sensing elements of the GRSC measure the distribution of ground reaction and shear sensing elements of the GRSC measure lateral forces and torque;
    determining a zero point at which the user's shoe is at zero velocity based on the detected pressure and shear sensor measurements;
    determining, based on the lateral force measured by the shear sensor at the zero point, the degree to which the user's bearing has changed; and
    sending the bearing changes to an internal motion unit (IMU) communicatively attached to the GRSC, wherein the IMU uses the determined bearing change to refine its calculated zero point and velocity determinations.

13. The method of claim 12, further comprising using the refined zero point and velocity determinations to determine which direction the user's foot is heading.

14. The method of claim 13, further comprising providing navigation indications to the user, indicating where the user has been and the direction the user is currently going.

15. The method of claim 14, further comprising sending the navigation indications to a global positioning satellite (GPS)-enabled device, wherein the GPS-enabled device uses the indications to determine the user's location without being connected to the GPS satellites.

16. The method of claim 12, wherein the GRSC's array of flexible capacitive sensor cells comprises an array of flexible top, fingered electrodes and bottom, fingered electrodes which are sensitive to both normal and shear strain.

17. The method of claim 16, wherein one or more of the top, fingered electrodes are placed over the flexible, bottom electrodes, the cells comprising an elastic dielectric material.

18. The method of claim 17, wherein upon receiving normal force over the top, fingered electrode, the elastic dielectric material of the cells is compressed, increasing capacitance between the top, fingered central square and the bottom, fingered electrodes equally, and upon receiving a combination of normal and shear force over the top, fingered electrode, the elastic dielectric material of the cells is compressed unevenly, shifting the top, fingered electrode and changing capacitance between the top, fingered electrode and each of the bottom, fingered electrodes in an uneven manner.

19. A method for navigating using a ground reaction sensor cluster (GRSC) and an inertial motion unit (IMU) in a global positioning satellite (GPS)-denied environment, the method comprising:

determining that a user has passed into an environment where a GPS device used by the user is no longer receiving GPS signals, wherein the GPS device is communicatively connected to a GRSC and an IMU;

detecting the user's footsteps using the GRSC, the GRSC comprising an array of pressure and shear sensors distributed along a contact portion of the user's shoe, wherein pressure sensing elements of the GRSC measure the distribution of ground reaction and shear sensing elements of the GRSC measure lateral forces and torque;

determining a zero point at which the user's shoe is at zero velocity based on the GRSC's detected pressure and shear sensor measurements;

determining, based on the lateral force measured by the shear sensor at the zero point, the degree to which the user's bearing has changed;

sending the bearing changes to an internal motion unit (IMU) communicatively attached to the GRSC, wherein the IMU uses the determined bearing change to refine its calculated zero point and velocity determinations; and determining the user's direction and velocity using the measurements of the GRSC and the IMU to navigate the user until the user's GPS device is back in range of GPS satellites.

20. The method of claim 19, further comprising:

receiving a GPS signal at the GPS device indicating that the GPS device is connected to a sufficient number of GPS satellites; and using the measurements of the GRSC and the IMU to provide the GPS device with incremental updates regarding the user's continued movements.

\* \* \* \* \*